(12) United States Patent
Goldstein et al.

(10) Patent No.: US 8,593,946 B2
(45) Date of Patent: Nov. 26, 2013

(54) CONGESTION CONTROL USING APPLICATION SLOWDOWN

(75) Inventors: Maayan Goldstein, Holon (IL); Onn Menahem Shehory, Yahud-Monosson (IL); Rachel Tzoref, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 12/197,323

(22) Filed: Aug. 25, 2008

(65) Prior Publication Data

US 2010/0046375 A1 Feb. 25, 2010

(51) Int. Cl.
*G01R 31/08* (2006.01)
(52) U.S. Cl.
USPC ........... 370/229; 370/237; 370/235; 370/352; 709/203; 709/230
(58) Field of Classification Search
None
See application file for complete search history.

(56) References Cited

U.S. PATENT DOCUMENTS

| | | | |
|---|---|---|---|
| 6,170,022 B1 | 1/2001 | Linville et al. | |
| 6,829,338 B2 | 12/2004 | Gawande et al. | |
| 2002/0131369 A1* | 9/2002 | Hasegawa et al. | 370/241 |
| 2003/0185154 A1* | 10/2003 | Mullendore et al. | 370/230 |
| 2005/0213507 A1* | 9/2005 | Banerjee et al. | 370/241 |

OTHER PUBLICATIONS

Kelvin Li et al., "A Measurement-Based Admission-Controlled Web Server", INFOCOM 2000. Nineteenth Annual Joint Conference of the IEEE Computer and Communications Societies. Proceedings. IEEE vol. 2, Issue, 2000 pp. 651-659 vol. 2 http://irl.eecs.umich.edu/jamin/papers/mbac/webserver.pdf.
S. Golze et al., "Fair Overload Handling Using Proof-of-Work Functions", This paper appears in: *Applications and the Internet. 2006. SAINT 2006. International Symposium on* publication Date: Jan. 23-27, 2006 On pp. 8 pp.
M. Welsh, D. Culler, and E. Brewer. "SEDA: An Architecture for Well-Conditioned, Scalable Internet Services." In Proc. SOSP-18, 2001. http://citeseer.ist.psu.edu/welsh01seda.html.
David Breitgand et al., "Panacea: Towards a Self-Healing Development Network", Integrated Network Management, 2007. IM '07. 10th IFIP/IEEE International Symposium on Publication Date: May 21, 2007-Yearly 25, 2007, On pp. 169-178 Location: Munich, Germany.
A. Lamprecht et al. "Data-Flow Analysis as Model Checking Within the jABC", Lecture Notes in Computer Science, vol. 3923, 2006. http://www.springerlink.com/content/r02p1h6w17875786/fulltext.pdf.

* cited by examiner

*Primary Examiner* — Duc C Ho
(74) *Attorney, Agent, or Firm* — Daniel Kligler

(57) ABSTRACT

A computer-implemented method is provided, including monitoring one or more parameters of a computer system that executes one or more service requester processes that issue service requests to one or more service provider processes. A congestion in the system is detected by analyzing the parameters. Upon identifying at least one of the service requester processes as contributing to the congestion, execution of the at least one of the service requester processes is slowed. Other embodiments are also described.

21 Claims, 5 Drawing Sheets

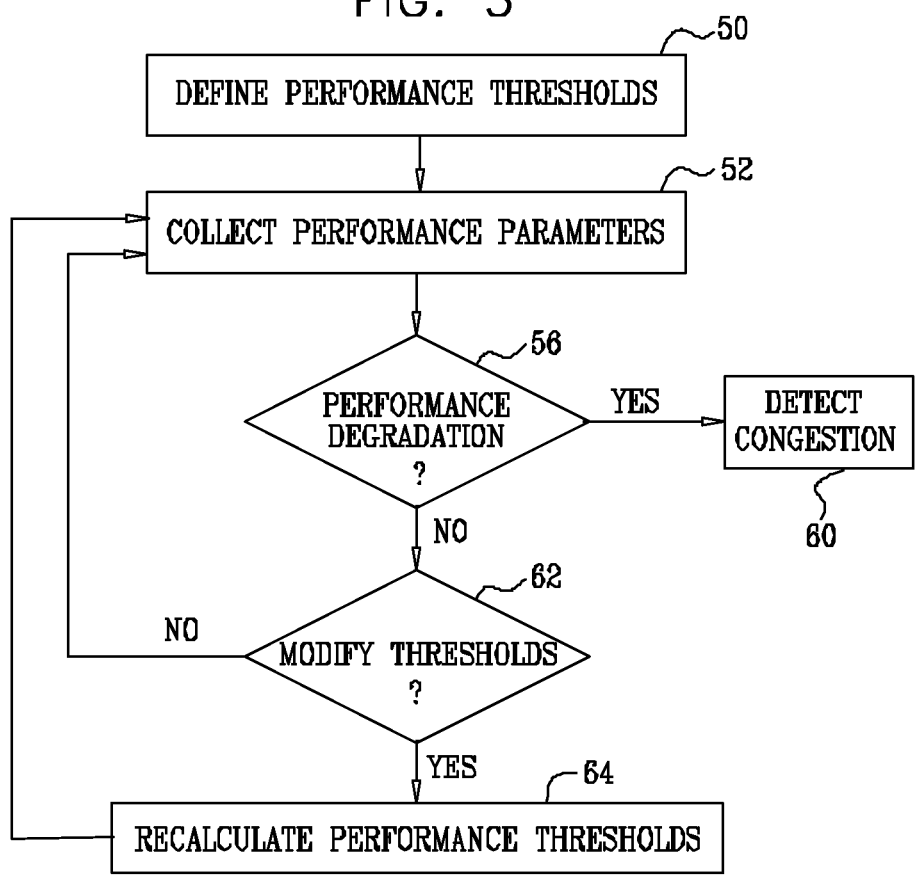

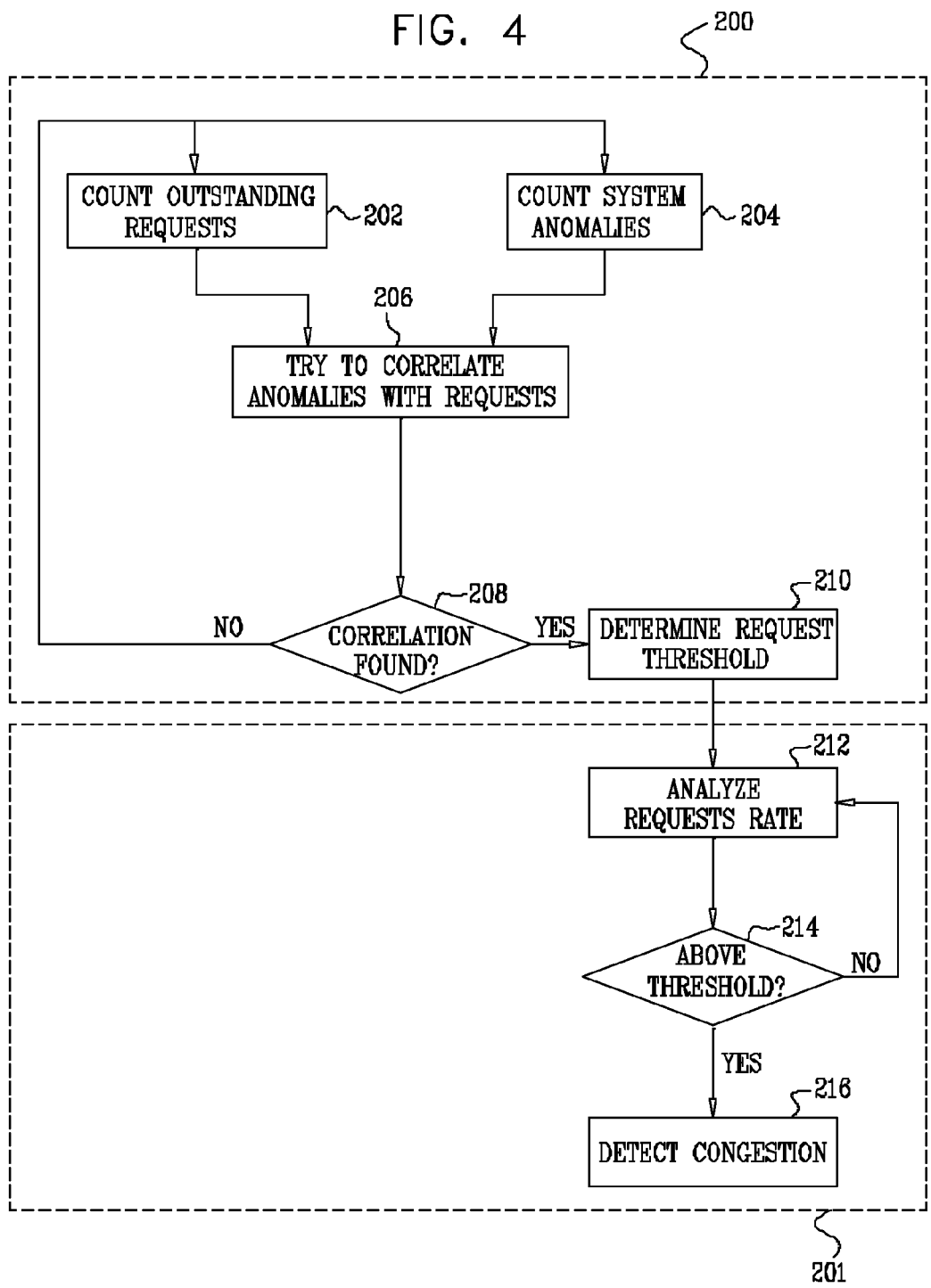

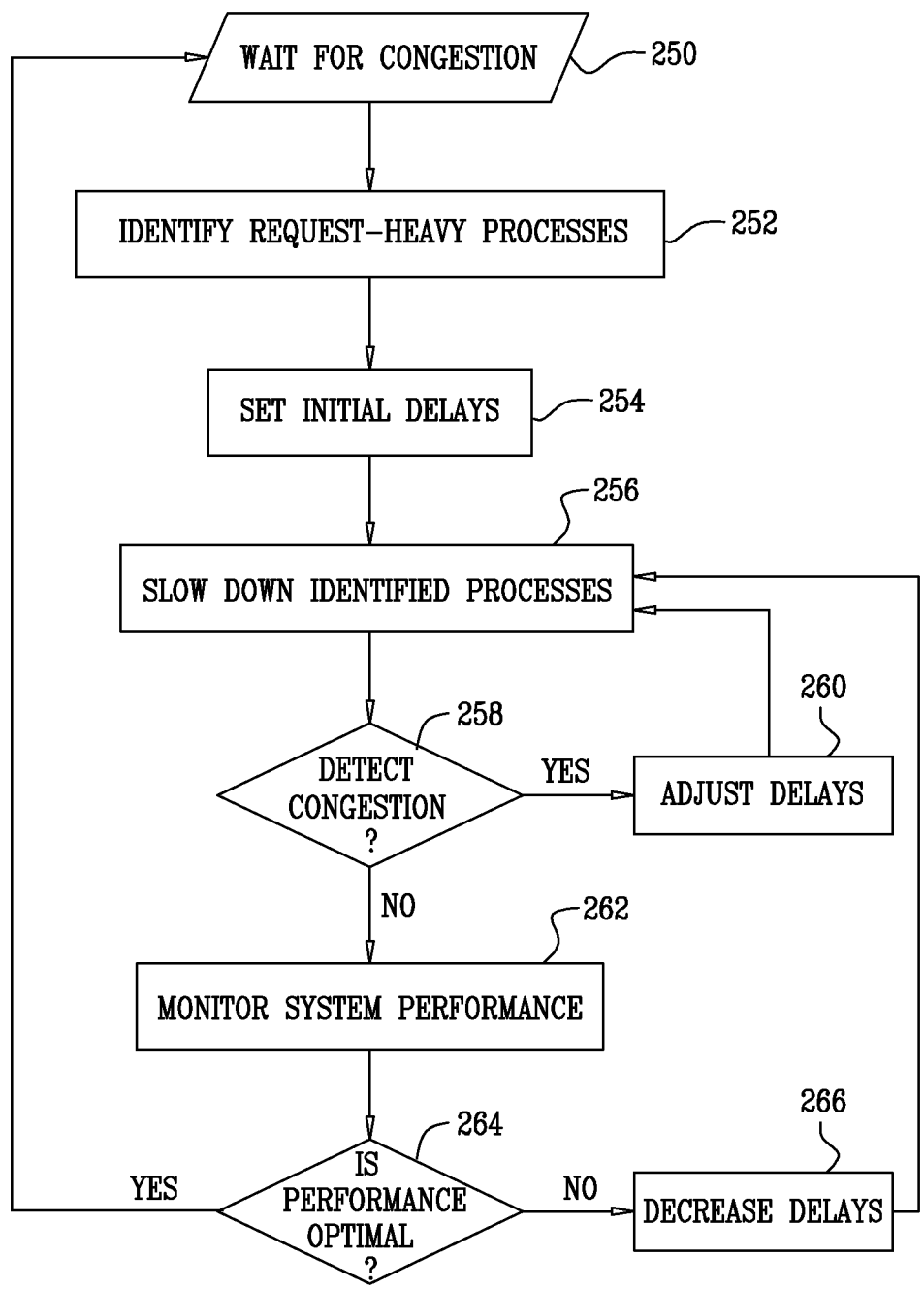

CONGESTION CONTROL USING APPLICATION SLOWDOWN

FIELD OF THE INVENTION

The present invention relates generally to computer systems, and particularly to methods and systems for preventing congestion.

BACKGROUND

Many computer systems execute one or more applications or processes that request service from other applications or process via a connectivity graph, such as a network. System congestion or service provider overload sometimes occurs when the number of requests issued exceeds the capacity of the service providers to efficiently reply to requests.

One approach for preventing or reducing congestion is thoroughly testing a system before production to ascertain the maximal load or bandwidth which the network can carry before becoming congested. The system specification then specifies this limitation. Some systems address congestion by providing an additional layer in service provider components. This layer receives all incoming requests and either accepts or rejects them depending on the availability of service provider resources and/or the number of pending requests.

BRIEF SUMMARY

Embodiments of the present invention provide a computer-implemented method for preventing and/or resolving computer system congestion. The method includes monitoring one or more parameters of a computer system that executes one or more service requester processes that issue service requests to one or more service provider processes, detecting a congestion in the system by analyzing the parameters, and identifying at least one of the service requester processes as contributing to the congestion. Execution of the at least one of the service requester processes is slowed in order to prevent and/or resolve the congestion.

In some embodiments of the present invention, a processor and an interface are provided to implement the techniques of the present invention. In some embodiments of the present invention, a computer software product for use with a computer system is provided, the product comprising a tangible computer-readable medium in which program instructions are stored, which instructions, when read by a computer, cause the computer to implement the techniques of the present invention.

The present invention will be more fully understood from the following detailed description of the embodiments thereof, taken together with the drawings in which:

BRIEF DESCRIPTION OF THE SEVERAL VIEWS OF THE DRAWINGS

FIG. 3 is a flow chart that schematically illustrates a method for detecting congestion in the system of FIGS. 1 and 2, in accordance with an embodiment of the present invention;

FIG. 4 is a flow chart that schematically illustrates a method for detecting congestion in the system of FIGS. 1 and 2, in accordance with an embodiment of the present invention; and FIG. 5 is a flow chart that schematically illustrates a method for preventing or resolving system congestion, in accordance with an embodiment of the present invention.

DETAILED DESCRIPTION

Overview

Many computer systems comprise a set of elements that execute applications that request services (herein "service requesters") from other elements, which perform services for the service requesters (herein "service providers"). These two sets of elements need not be mutually exclusive. The two sets of elements are connected to one another via a connectivity graph, such as a network. The service requesters send service requests (herein "requests") to the service providers via the network. The service providers send responses to received requests and provide the requested services.

Computer systems implementing this system architecture sometimes suffer from congestion. Congestion occurs when the service requesters issue requests at a rate higher than the service providers can handle. Systems that do not implement techniques for preventing congestion generally allocate resources to organize and track the resulting backlog. Such backlog tracking in turn depletes the resources available for provision of services, which can further increase the backlog in a vicious circle. As a result, the congestion may cause severe performance degradation of the system. This degradation often manifests itself as deadlock, system crashes, service errors, and/or severe delay in provision of service, inter alia.

Some embodiments of the present invention provide a method for preventing, reducing the likelihood of, and/or resolving congestion in a computer system executing service requester processes that issue service requests to service provider processes. The method comprises detecting imminent or currently occurring congestion in the system. Upon detecting the congestion, at least one of the service requester processes is identified as contributing to the congestion. Execution of the identified process is slowed, in order to prevent or resolve the congestion. For some applications, the method is performed without the knowledge or participation of the service provider processes.

In some embodiments of the present invention, system parameters are monitored for degradation in performance, which provides an indication of imminent or occurring system congestion. In other embodiments of the present invention, a learning process is performed in which a sample of outstanding service requests taken at a plurality of points in time is correlated with the occurrence of system problems or process execution errors. Based on the correlation, a threshold number, above which the execution anomalies are highly correlated with the outstanding serviced requests rate, is derived and subsequently used to detect imminent or occurring system congestion.

System Description

Figure 1:
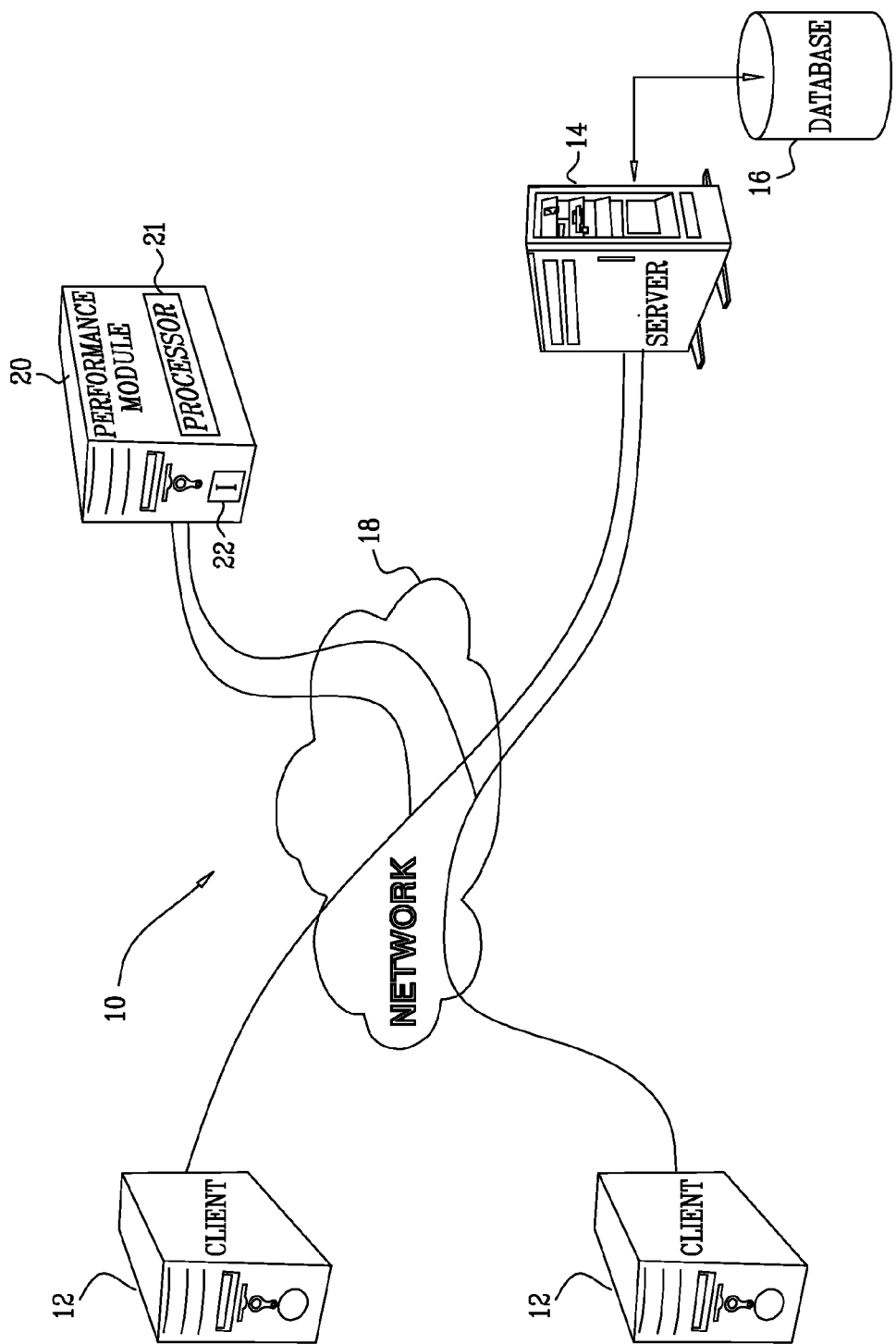
FIG. 1 is a block diagram that schematically illustrates a computer system, in accordance with an embodiment of the present invention.

FIG. 1 is a block diagram that schematically illustrates a computer system 10, in accordance with an embodiment of the present invention. System 10 comprises one or more client workstations 12 and at least one server 14, which provides services to clients 12, typically utilizing at least one database 16. Each of client workstations 12 typically comprises a general-purpose computer workstation, having a processor and an interface coupled to a network 18. Server 14 comprises at least one processor and an interface coupled to network 18. System 10 further comprises a system performance module 20, which comprises at least one processor 21 and an interface 22 coupled to network 18. The system performance management functions of system performance module 20 are typically implemented in software, which may be provided to the module in electronic form, over a network, for example, or it may alternatively be furnished on tangible media, such as optical, magnetic or electronic memory media. For some applications, system performance module 20 is implemented in server 14 or one or more of clients 12, rather than in a separate computer workstation.

Figure 2:
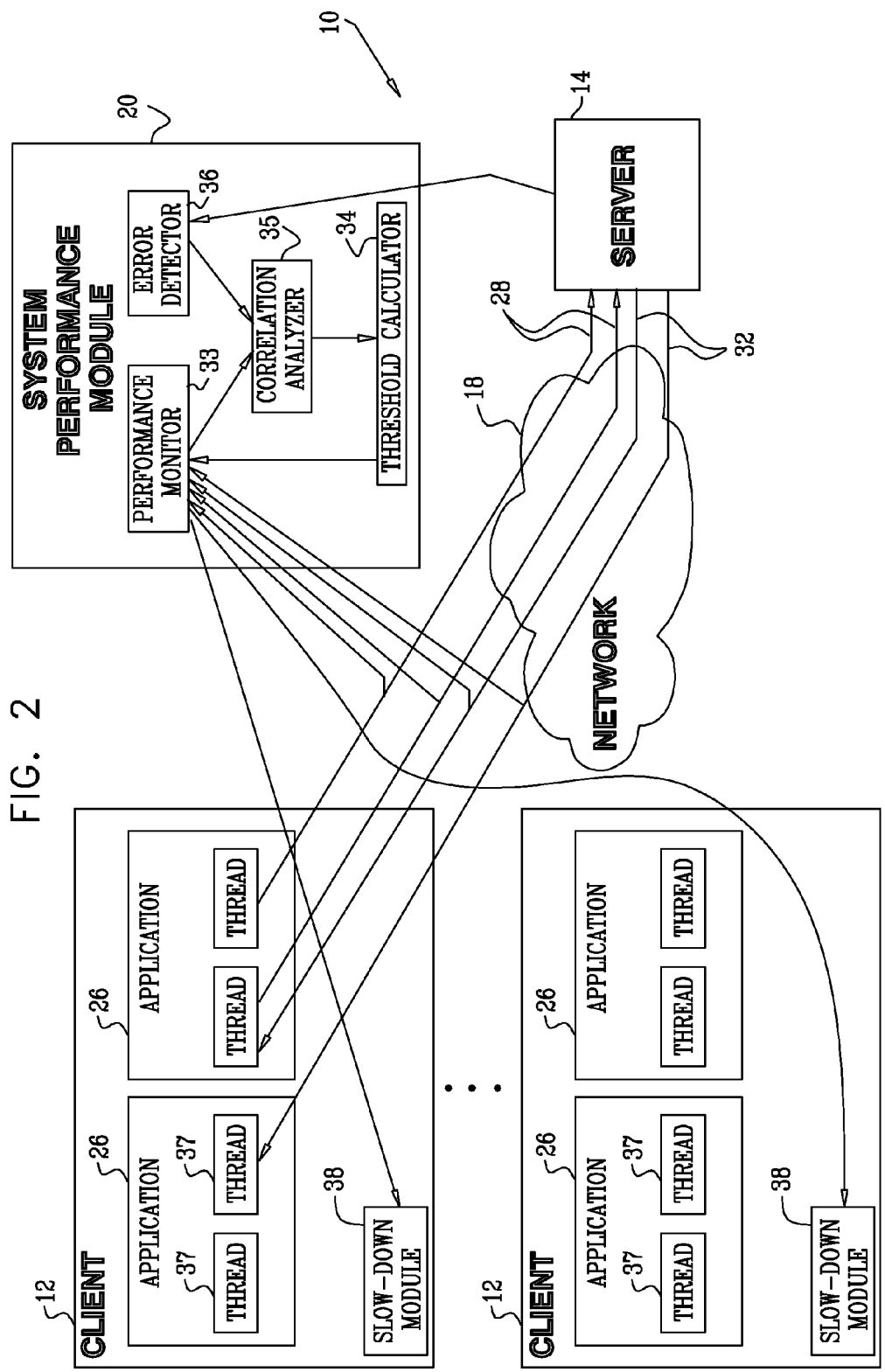
FIG. 2 is a block diagram that schematically illustrates details of the computer system of FIG. 1, in accordance with an embodiment of the present invention.

FIG. 2 is a block diagram that schematically illustrates details of computer system 10, in accordance with an embodiment of the present invention. Each client 12 executes one or more application programs 26, which typically execute one or more respective threads 37. During execution, applications 26 generate service requests 28, which network 18 routes to server 14. Server 14 sends back a response 32 for each request issued by one of clients 12 that is serviced.

System performance module 20 implements a performance monitor 33, which collects data pertaining to service requests 28 and responses 32, as well as other system parameters, as described hereinbelow, typically by monitoring, via interface 22 (shown in FIG. 1), service requests 28 and responses 32 as they traverse network 18. Alternatively, performance monitor 33 monitors the requests and responses by receiving, via interface 22, information provided by the clients and/or server to the performance monitor. For some applications, system performance module 20 further implements a threshold calculator 34, which either computes or receives as input, such as from a system administrator, threshold values of system performance parameters that performance monitor 33 uses to assess performance degradation. In an embodiment of the present invention, system performance module 20 alternatively or additionally implements a correlation analyzer 35 and/or an error detector 36.

Each client 12 implements one or more slow-down modules 38, typically in software that executes on the processor of the client. Under the direction of performance monitor 33, the slow-down modules cause some or all of the processes executed by clients 12 (such as threads 37 of some or all of applications 26) to execute more slowly. The software of slow-down modules 38 may be deployed by manually loading the software directly in clients 12, such as from a storage medium, e.g., as a CD-ROM or DVD-ROM. Alternatively, the software may be automatically or semi-automatically deployed into clients 12 by sending the software to a central server or a group of central servers. The software is then downloaded into the clients. Further alternatively, the software may be sent directly to the clients via e-mail, such as from system performance module 20. The software is then either detached to a directory or loaded into a directory by a button on the e-mail that executes a program that detaches the process software into a directory. Still further alternatively, the software is sent directly to a directory on the hard drive of the clients.

In an embodiment of the present invention, performance monitor 33 monitors one or more system parameters to assess a degradation of system performance caused by the generation of service requests 28 at a rate that exceeds the capacity of server 14. For some applications, threshold calculator 34 specifies one or more thresholds pertaining to the rates of service requests 28, the rates of responses 32, and/or the relation between them. Performance monitor 33 monitors the parameters related to service requests 28 and responses 32, and compares the monitored parameters to the thresholds. If the comparison indicates performance degradation, performance monitor 33 detects that congestion is imminent or occurring.

For some applications, the system parameters include a serviced requests rate, such as the rate of requests sent by clients 12 that receive service from server 14. For other applications, the system parameters include an average response time of system 10, such as the average time elapsed from the sending of each of service requests 28 by one of threads 37 to the receipt by the thread of the requested service from server 14. The performance monitor may obtain the response times, for example, by using a performance monitoring tool known in the art. Performance monitor 33 compares the response times to one of the thresholds, for example, the goal response time defined in the service level agreement (SLA) applicable to system 10. Additionally or alternatively, the performance monitor may calculate a percentage of response times which are below one of the thresholds, and assess the degradation of system performance by comparing this percentage to another one of the thresholds, for example, 90%.

In an embodiment of the present invention, performance monitor 33 formally models the rate at which each application 12 generates service requests 28, and the capacity of server 14 to handle the service requests. For some applications, the performance monitor uses techniques known in queuing theory for performing the modeling. The performance monitor may use real-time monitored data in conjunction with the modeled parameters to detect imminent or occurring system performance degradation.

In an embodiment of the present invention, performance monitor 33 monitors performance of individual system components, for example, a module of server 14 that accesses database 16. Threshold calculator 34 sets initial values for the thresholds that pertain to the monitored components, such as a time within which server 14 receives data from database 16. In another embodiment of the present invention, performance monitor 33 monitors the number of open connections to database 16.

If, as sometimes occurs, threshold calculator 34 sets suboptimal initial values of the thresholds, performance monitor 33 may detect performance degradation when system 10 functions properly (a "false positive") and/or not detect performance degradation when system 10 suffers from congestion (a "false negative"). For example, a system administrator may input arbitrary or random thresholds into threshold calculator 34. In an embodiment of the present invention, in order to address this problem, performance module 20 defines a system-level objective (SLO) that specifies a performance goal for system 10 as a whole, for example, that server 14 should service 90% of requests 28 within two seconds. Threshold calculator 34 then dynamically adapts the thresholds for each monitored system component, such as using techniques described in US Patent Application Publication 2006/0276995 to Breitgand et al., US Patent Application Publication 2006/0293777 to Breitgand et al., and/or an article by Breitgand et al. entitled, "Automated and adaptive threshold setting: enabling technology for autonomy and self-management," *Second International Conference on Autonomic Computing (ICAC'05)*, 2005, pp. 204-215, all three of which references are incorporated herein by reference. For example, performance monitor 33 may observe when system 10 violates the SLO, and instruct threshold calculator 33 to change the thresholds in such a way that violations of the thresholds by the monitored system components indicate violation of the SLO by the system. In this way, the thresholds provide to performance monitor 33 a more accurate indication of system performance degradation.

FIG. 3 is a flow chart that schematically illustrates a method for detecting congestion in system 10, in accordance with an embodiment of the present invention. The method begins at an input step 50, at which threshold calculator 34 sets values for the thresholds. At a measurement step 52, performance monitor 33 collects system performance parameters, for example, as described hereinabove with reference to FIG. 2. At a performance degradation check step 56, the performance monitor compares the collected performance parameters to the thresholds. If the comparison indicates a performance degradation, the performance monitor detects a congestion state at a congestion detection step 60, and slows one or more processes the may contribute to or are contributing to the congestion, as described hereinbelow with reference to FIG. 5. Threshold calculator 34 generally sets the thresholds to enable detection of the congestion prior to its occurrence, i.e., detection of imminent congestion. Alternatively, in some cases, the performance monitor detects the congestion after the congestion begins. If, on the other hand, the performance monitor does not find a performance degradation at step 56, the performance monitor checks whether it should modify the current thresholds, such as using techniques described hereinabove with reference to FIG. 2, at an adaptive threshold check step 62. If the performance monitor finds that it should modify the current thresholds, the threshold calculator calculates the modified thresholds at a threshold recalculation step 64, and returns to measurement step 52.

Reference is again made to FIG. 2. In an embodiment of the present invention, system performance module 20 initially performs a learning phase, in which the system samples time series of outstanding service requests 28, observes occurrences of system anomalies, and correlates the occurrences of the anomalies with the number of outstanding requests to find a threshold number of outstanding service requests 28. System 10 subsequently performs a monitoring phase, during which the system detects system congestion by comparing the number of outstanding service requests 28 with the threshold number determined during the learning phase.

In this embodiment, system performance module 20 comprises a load monitor, error detector 36, and correlation analyzer 35. The load monitor counts service requests 28 issued by threads 36 and responses 32 to the requests provided by server 14, and tracks the rate at which the requests are served. Error detector 36 observes the occurrence of anomalies in system 10. The anomalies may include, for example, system problems and/or execution errors, such as exceptions, error indications from clients 12, error indications from server 14, system crashes, or system deadlocks. The anomalies may also include a low rate at which the requests are serviced.

During the learning phase, correlation analyzer 35 correlates the number of outstanding requests with the occurrences of the anomalies to obtain a threshold number, above which system anomalies occur with a certain probability, such as 85%. For some applications, the threshold number of outstanding requests may be slightly lower than the numbers of requests that were outstanding when the respective anomalies occurred.

During the monitoring phase, performance monitor 33 uses the threshold number to assess performance degradation and to detect imminent congestion in the system. For some applications, system 10 continues to perform the learning process at least intermittently during the ongoing monitoring for congestion. For example, threshold calculator 34 may reduce the threshold upon the occurrence of congestion that the system failed to identify beforehand.

For some applications, performance monitor 33 accesses a request queue internal to server 14 to ascertain the number of outstanding requests. For other applications, performance monitor 33 counts the number of outstanding requests by monitoring network 18, and queries neither clients 12 nor server 14.

For some applications, correlation analyzer 35 uses association rule learning to perform the correlation. Association rule learning is known in the art as a method for discovering interesting relations between variables. For example, the rule {onions, vegetable}→{beef} found in the sales data of a supermarket would indicate that if a customer buys onions and vegetables together, he or she is likely to also buy beef. In an embodiment of the present invention, correlation analyzer 35 uses the rule {(number of requests 28−number of responses 32)>threshold}→{occurrence of anomaly}. The correlation analyzer counts the number of requests 28 and responses 32, and finds a threshold value for the difference between the number of requests and the number of responses above which system anomalies occur with a high probability. For example, the threshold may be 200. Alternatively, the rule specifies rates of requests and responses.

For some applications, correlation module 140 uses techniques described by Ernst et al., in an article entitled, "The Daikon system for dynamic detection of likely invariants" *Science of Computer Programming*, vol. 69, no. 1-3, December 2007, pp. 35-45, which is incorporated herein by reference. This article describes a tool for machine learning which can help in correlating system anomalies to outstanding requests. Section 4.3, which lists applications which use the tool in this way, is of particular relevance. Another article by Ernst et al., entitled, "Dynamically discovering likely program invariants to support program evaluation", *IEEE Transactions on Software Engineering*, vol. 27, no. 2, February, 2001, pp. 99-123, which is incorporated herein by reference, provides further detail regarding these techniques.

FIG. 4 is a flow chart that schematically illustrates a method for detecting congestion in the embodiment of system 10 described hereinabove with reference to FIG. 2, in accordance with an embodiment of the present invention. The method comprises a learning phase 200 and a monitoring phase 201. Learning phase 200 begins at a request count step 202, at which performance monitor 33 counts numbers of service requests 28 (FIG. 2) outstanding at a plurality of respective points in time. Generally in parallel with step 202, at an anomaly observation step 204, error detector 36 observes anomalies which occur in the system, as described hereinabove with reference to FIG. 2. For some applications, performance monitor 33 performs request count step 202 only upon observing an anomaly at step 204. At a correlation step 206, correlation analyzer 35 tries to correlate the occurrences of anomalies with the time series of outstanding requests at the time of the occurrence. For some applications, correlation analyzer 35 collects measurements both from the application side (clients 12) and the system side (server 14) at a plurality of points in time. Analyzer 35 compares both sets of measurements to two different sets of thresholds. For example, at the application side, the threshold may be defined as "threshold serviced requests rate is 80%," at the system side the threshold may be defined as "threshold requests queue size is 10," and there may be an 85% chance that a serviced requests rate exceeds the 80% threshold when the requests queue size exceeds 10.

At a correlation check step 208, if correlation analyzer 35 does not find a correlation, performance monitor 33 continues counting requests at step 202 and error detector 36 continues observing anomalies at step 204. If, on the other hand, the correlation module finds a correlation at step 208, threshold calculator 34 sets an outstanding request threshold, above which system anomalies occur with a certain probability, at a threshold calculation step 210, which concludes learning phase 200.

During monitoring phase 201, performance monitor 33 recovers the current value of the serviced requests rate, at a requests rate analysis step 212. At a threshold check step 214, performance monitor 33 compares that value with the outstanding request threshold found at step 210. If the value is less than the threshold, the performance monitor returns to step 212 and continues to monitor. If, on the other hand, the value is greater than the threshold, performance monitor 33 detects imminent congestion in the system, at a congestion detection step 216, and slows one or more processes that may cause the congestion, as described hereinbelow with reference to FIG. 5.

Reference is now made to FIG. 5, which is a flow chart that schematically illustrates a method for preventing or resolving system congestion, in accordance with an embodiment of the present invention. The method begins at a congestion wait step 250, at which system performance module 20 (FIG. 1) waits until it detects either imminent or current congestion, for example, as described hereinabove with reference to FIG. 3 or FIG. 4.

Upon detecting imminent or current congestion, system performance module 20 attempts to prevent or resolve the congestion by slowing one or more processes, such as applications or application threads, contributing to the congestion. At a process identification step 252, system performance module 20 identifies one or more of the service requester execution threads 37 or applications 26 executed by one or more of clients 12 as request-heavy threads, which contribute to the congestion and the execution of which should be slowed.

For some applications, each client 12 receives a list of the request-heavy threads as input, for example, those threads or applications that issue a high volume of requests 28 or which issue requests 28 with high priority. This input may be provided by a system administrator, and/or by a performance assessment or monitoring tool. Alternatively, each client 12 may receive a list of threads or applications that do not issue requests 28 and which the client should not slow, and may treat all of the remaining threads or applications as request-heavy threads. Alternatively or additionally, each client 12 monitors threads 37 or applications 26 to identify those which produce a high volume or high rate of requests 28.

For some applications, each of clients 12 analyzes the threads or applications it executes to identify the request-heavy threads, for example, by using data flow analysis techniques. As known in the art, data flow analysis is a static analysis technique which attempts to extract information about the run-time behavior of a computer program without running the program. Typically, each of clients 12 defines a set of properties which adversely affect system congestion and finds whether the threads 37 or applications 26 it executes are characterized by one or more properties from the set. The set of properties may include, for example, issuance of high priority service requests. For example, the clients may use the method of data flow analysis described by Lamprecht et al. in a chapter entitled "Data Flow Analysis as Model Checking Within the jABC," *Lecture Note in Computer Science*, Springer Berlin/Heidelberg, Vol 3923/2006, pp. 101-104, which is incorporated herein by reference.

Referring still to FIG. 5, at an initial delay set step 254, system performance module 20 sets one or more initial delays by which it slows the execution of the respective identified request-heavy threads. For some applications, system performance module 20 indicates to each of clients 12 that executes one or more request-heavy threads to insert delays, and each of clients 12 sets the initial delays for each of the threads or applications it executes. For other applications, module 20 sets the same initial delays for all of clients 12. For some applications, module 20 or each of clients 12 sets the initial delays randomly. For other applications, system performance module 20 or each of clients 12 receives as input the initial delays, such as from a system administrator.

At an execution slow-down step 256, one or more of slow-down modules 38 initiate respective slow-downs in the execution of the processes, such as threads or applications, identified as request-heavy at step 252, by implementing respective delays in the processes. The respective delays are selected from the initial delays or the feedback-generated delays, as described hereinbelow.

In a first technique for slowing the request-heavy processes, the slow-downs are implemented in hardware. Each of slow-down modules 38 checks whether its client 12 executes one or more processes (e.g., threads 37 or applications 26) to which non-zero process delays have been assigned. If so, the slow-down module reduces the speed of a hardware device on which the processes execute. For example, slow-down module 38 may reduce the clock frequency of one or more CPUs or processing units in the hardware device which executes the relevant applications 26 or threads 37.

In a second technique for slowing the request-heavy processes, the slow-downs are implemented in software code of the processes. Each of slow-down modules 28 checks whether its client 12 executes one or more processes (e.g., threads 37 or application 26) to which non-zero process delays have been assigned. If so, the slow-down module inserts the respective process delay at one or more points during the execution of the process, for example, before the process issues service requests 28. For some applications, slow-down module 38 uses code instrumentation techniques to find locations in the code of the process at which the module can insert the process delay. Code instrumentation is the process of monitoring events during code execution and providing to external processes an opportunity to execute a desired function responsively to the events. For some applications, slow-down module 38 uses the ConTest tool to instrument the code to automatically insert the process delays. The ConTest tool is described by Nir-Buchbinder et al. in an article entitled, "ConTest listeners: A concurrency-oriented infrastructure," *Foundations of Software Engineering, Fourth international workshop on Software quality assurance: in conjunction with the 6th ESEC/FSE joint meeting,* 2007, pp. 9-16, which is incorporated herein by reference. The "ConTest listener" tool instruments code and finds therein locations of events which are relevant to inter-process synchronization, for example, accesses to shared variables, or calls to different types of synchronization primitives (e.g., obtaining or releasing locks, or starting and joining threads).

Alternatively or additionally, slow-down modules 38 slow the request-heavy processes using techniques described by Golze et. al. in an article entitled, "Fair overload handling using proof-of-work functions," *Proceedings of the 2005 Symposium on Applications and the Internet (SAINT'06),* 2006, which is incorporated herein by reference. Slow-down modules 38 use the method described by Golze et al. to slow clients 12 by forcing each client to perform a complex computation, requiring a significant amount of client computation resources, before issuing service requests 28. This computation slows clients 12 that issue a large number of service requests.

For some applications, the complex computation includes performance of a Hashcash function, as is known in the anti-spam art. A seed string is generated according to a set of rules, and the thread or application complements the seed string with random or systematically generated strings and generates an SHA-1 hash over the whole string. This process is repeated until an input string is found which in combination with the seed string generates an hash digest which starts with at least a defined number of bits that are zero. Increasing the number of requested zero bits by one doubles the difficulty of the computation.

Alternatively, for some applications, the complex computation includes performance of a modified Hashcash function, which replaces the zero bit criterion which evaluates whether a hash digest is valid with a 32-bit integer threshold. The first 32 bits of the digest, when interpreted as an unsigned integer, must be smaller than this threshold. This means that any adaptation of the threshold has a direct proportional effect on the difficulty of the computation. In contrast to the standard Hashcash function, this modified function can be adapted linearly.

For some applications, system performance module 20 uses a combination of two or more of these techniques for slowing the identified request-heavy processes.

Referring still to FIG. 5, at a congestion detection check step 258, system 10 checks for congestion (either imminent or currently occurring), for example, using the techniques described hereinabove with reference to FIGS. 3 and/or 4. If the system detects system congestion, it may adjust the process delays by which each slow-down module 38 slows the processes (e.g., threads or applications) which were identified as request-heavy at step 252. Typically, each slow-down module 38 increases the process delays so as to increase the slow-down in the threads or applications so as to prevent and/or resolve the system congestion. Alternatively or additionally, upon detecting imminent or current congestion, the system may identify additional request-heavy processes, by repeating step 252.

If, on the other hand, system 10 does not detect system congestion at step 258, the system monitors one or more system parameters to assess whether the induced slow-downs have caused unnecessary degradation of system performance (due to slow process execution, and not system congestion), at a performance monitoring step 262, for example, using techniques described hereinabove with reference to FIGS. 2 and 3. At a performance optimality check step 264, system 10 decides whether the monitored parameters indicate sub-optimal performance of the system. For example, performance monitor 33 may detect unnecessary performance degradation by monitoring the size of the requests queue at the server 24 and comparing it to a performance degradation threshold. If the size of the requests queue is less than the performance degradation threshold, performance monitor 33 concludes that the delays that it initiated at step 256 are too great and should be decreased. If the system does not detect sub-optimal performance, it returns to step 250, and leaves in the place the induced slow-downs. If, on the other hand, the system identifies sub-optimal performance, the system may reduce the amount by which it slows the relevant threads or applications at a delay decrease step 266. For some applications, the system uses a binary search algorithm, for example, based on the Bolzano-Weierstrass Theorem, to decrease the delays. For some applications, each slow-down module 38 increases the speed of the hardware which executes the threads or applications, for example, by increasing the speed of the CPUs or one or more processing devices in the hardware. For some applications, each slow-down module 38 reduces the process delays it inserts into the relevant processes (e.g., threads or applications).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

In addition, it will be appreciated by one skilled in the art that the present invention may be embodied as a computer system packaged together in a single physical encasement, and that the network may be an interconnection scheme among several components of the encasement, for example using a printed circuit board. It is noted that although clients 12 and server 14 are generally described herein as implemented on separate computer systems, in some embodiments one or more of clients 12 and/or server 14 are implemented in a single computer system.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method comprising:
monitoring one or more parameters of a computer system that executes one or more service requester processes that issue service requests to one or more service provider processes;
detecting a congestion in the system by analyzing the parameters;
identifying at least one of the service requester processes as contributing to the congestion; and
slowing execution of the at least one of the service requester processes.

2. The method according to claim 1, wherein the congestion is an imminent congestion, and wherein detecting comprises detecting the imminent congestion before it occurs.

3. The method according to claim 1, wherein detecting comprises detecting the congestion after the congestion begins.

4. The method according to claim 1, wherein the service requester processes issue the service requests to the service provider processes via a network, and wherein monitoring the one or more parameters comprises collecting information from the network about the service requests.

5. The method according to claim 1, wherein monitoring comprises monitoring the one or more parameters without receiving the one or more parameters from the one or more service provider processes.

6. The method according to claim 1, wherein identifying the at least one of the service requester processes as contributing to the congestion comprises finding that the at least one of the service requester processes is characterized by one or more properties indicative of a level of contribution of the at least one of the service requester processes to the congestion.

7. The method according to claim 1, wherein monitoring the parameters and detecting the congestion comprise:
during a learning phase, recovering, at a plurality of points in time, respective values of a serviced requests rate, observing one or more occurrences of execution anomalies in the computer system at one or more of the points in time, respectively, and correlating the occurrences of the execution anomalies with the respective values of the serviced requests rate at or near the respective points in time to find a threshold value above which the execution anomalies are highly correlated with the serviced requests rate; and
during a monitoring phase, recovering a monitored value of the serviced requests rate, and detecting the congestion by comparing the monitored value with the threshold value.

8. The method according to claim 1, wherein detecting the congestion comprises:
specifying one or more thresholds for the one or more parameters, respectively; and
comparing the parameters with the respective thresholds.

9. The method according to claim 8, wherein specifying the thresholds comprises setting one or more initial values of the thresholds, and modifying the initial values dynamically responsively to the monitored parameters.

10. The method according to claim 8, wherein monitoring the one or more parameters comprises formally modeling a rate of issuance of the service requests and a capacity of the one or more service provider processes to handle the service requests.

11. The method according to claim 1, wherein slowing the execution of the at least one of the service requester processes comprises inserting a delay into software code of the at least one of the service requester processes.

12. The method according to claim 1, wherein slowing the execution of the at least one of the service requester processes comprises reducing a speed of one or more hardware devices that execute the at least one of the service requester processes.

13. The method according to claim 1, wherein slowing the execution of the at least one of the service requester processes comprises dynamically adjusting a degree of the slowing responsively to at least one of the monitored parameters.

14. Apparatus for use with a computer system, the apparatus comprising:
   an interface; and
   a processor, coupled to the interface, and configured to monitor, via the interface, one or more parameters of the computer system, which executes one or more service requester processes that issue service requests to one or more service provider processes, detect a congestion in the system by analyzing the parameters, identify at least one of the service requester processes as contributing to the congestion, and, via the interface, slow execution of the at least one of the service requester processes.

15. The apparatus according to claim 14, wherein the congestion is an imminent congestion, and wherein the processor is configured to detect the imminent congestion before it occurs.

16. The apparatus according to claim 14, wherein the processor is configured to monitor the one or more parameters without receiving the one or more parameters from the one or more service provider processes.

17. The apparatus according to claim 14, wherein the processor is configured to identify the at least one of the service requester processes as contributing to the congestion by finding that the at least one of the service requester processes is characterized by one or more properties indicative of a level of contribution of the at least one of the service requester processes to the congestion.

18. The apparatus according to claim 14, wherein the processor is configured to monitor the parameters and detect the congestion by:
   during a learning phase, recovering, at a plurality of points in time, respective values of a serviced requests rate, observing one or more occurrences of execution anomalies in the computer system at one or more of the points in time, respectively, and correlating the occurrences of the execution anomalies with the respective values of the serviced requests rate at or near the respective points in time to find a threshold value above which the execution anomalies are highly correlated with the serviced requests rate, and
   during a monitoring phase, recovering a monitored value of the serviced requests rate, and detecting the congestion by comparing the monitored value with the threshold value.

19. The apparatus according to claim 14, wherein the processor is configured to detect the congestion by specifying one or more thresholds for the one or more parameters, respectively, and comparing the parameters with the respective thresholds.

20. The apparatus according to claim 14, wherein the processor is configured to slow the execution of the at least one of the service requester processes by inserting, via the interface, a delay into software code of the at least one of the service requester processes.

21. The apparatus according to claim 14, wherein the processor is configured to slow the execution of the at least one of the service requester processes by reducing, via the interface, a speed of one or more hardware devices that execute the at least one of the service requester processes.

* * * * *